United States Patent
Zhang (10) Patent No.: US 8,379,154 B2
(45) Date of Patent: Feb. 19, 2013

(54) KEY-FRAME EXTRACTION FROM VIDEO

(76) Inventor: Tong Zhang, Palo Alto, CA (US)

( * ) Notice: Subject to any disclaimer, the term of this patent is extended or adjusted under 35 U.S.C. 154(b) by 2048 days.

(21) Appl. No.: 11/433,039

(22) Filed: May 12, 2006

(65) Prior Publication Data

US 2007/0263128 A1    Nov. 15, 2007

(51) Int. Cl.
H04N 5/14    (2006.01)
H04N 9/64    (2006.01)

(52) U.S. Cl. ........................................ 348/701
(58) Field of Classification Search .................. None
See application file for complete search history.

(56) References Cited

U.S. PATENT DOCUMENTS

| | | | |
|---|---|---|---|
| 5,576,950 A | 11/1996 | Tonomura et al. | |
| 6,771,268 B1 * | 8/2004 | Crinon | 345/475 |
| 6,782,049 B1 | 8/2004 | Dufaux et al. | |
| 7,131,059 B2 * | 10/2006 | Obrador | 715/209 |
| 7,184,100 B1 * | 2/2007 | Wilf et al. | 348/700 |
| 7,447,337 B2 * | 11/2008 | Zhang et al. | 382/107 |
| 7,496,228 B2 * | 2/2009 | Landwehr et al. | 382/170 |
| 7,512,286 B2 * | 3/2009 | Luo | 382/286 |
| 7,739,598 B2 * | 6/2010 | Porter et al. | 715/723 |
| 2002/0146168 A1 * | 10/2002 | Lee et al. | 382/165 |
| 2004/0052505 A1 | 3/2004 | Ahmad et al. | |
| 2007/0182861 A1 * | 8/2007 | Luo et al. | 348/700 |

FOREIGN PATENT DOCUMENTS

WO    WO 03/101097    12/2003

* cited by examiner

*Primary Examiner* — Nhon Diep (57) ABSTRACT

Techniques that enable flexible key-frame extraction from video. Key-frame extraction according to the present teachings includes segmenting a video into a set of shots each having a set of video frames and selecting a set of key-frames from the shots in response to an image quality of the corresponding video frames. The present techniques include a set of user selectable modes that enable key-frame extraction to be adapted to an underlying platform.

20 Claims, 6 Drawing Sheets

KEY-FRAME EXTRACTION FROM VIDEO

BACKGROUND

A video may include a series of video frames each containing a video snap-shot of an image scene. The series of video frames may be rendered on a display at an appropriate frame rate to provide a playback of the video.

A video system may include the capability of extracting a subset of the video frames of a video to be used as key-frames. For example, a set of key-frames may be extracted from a video to construct a storyboard for the video. A storyboard may be constructed by rendering the extracted key-frames as a series of thumbnail images that provide a viewer with a visual indication of the content of the video.

A method for extracting key-frames from a video may be based on an arrangement of shots in the video. For example, a professionally edited video may be arranged into a set of carefully selected shots. Key-frames may be extracted from an edited video by detecting boundaries between the shots and then selecting a key-frame at the beginning, middle, or the end of each shot.

Unfortunately, extracting key-frames from the beginning, middle, or the end of the shots in a video may not yield the best key-frames for representing the video. In addition, extracting key-frames from a video based on the arrangement of shots in the video may not provide flexibility in key-frame extraction. For example, extracting key-frames from a video based on the arrangement of shots in the video may not take into account the nature of an underlying platform of a video system or the limitations of communication in a video system.

SUMMARY OF THE INVENTION

Techniques are disclosed that enable flexible key-frame extraction from video. Key-frame extraction according to the present teachings includes segmenting a video into a set of shots each having a set of video frames and selecting a set of key-frames from the shots in response to an image quality of the corresponding video frames. The present techniques include a set of user selectable modes that enable key-frame extraction to be adapted to an underlying platform.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
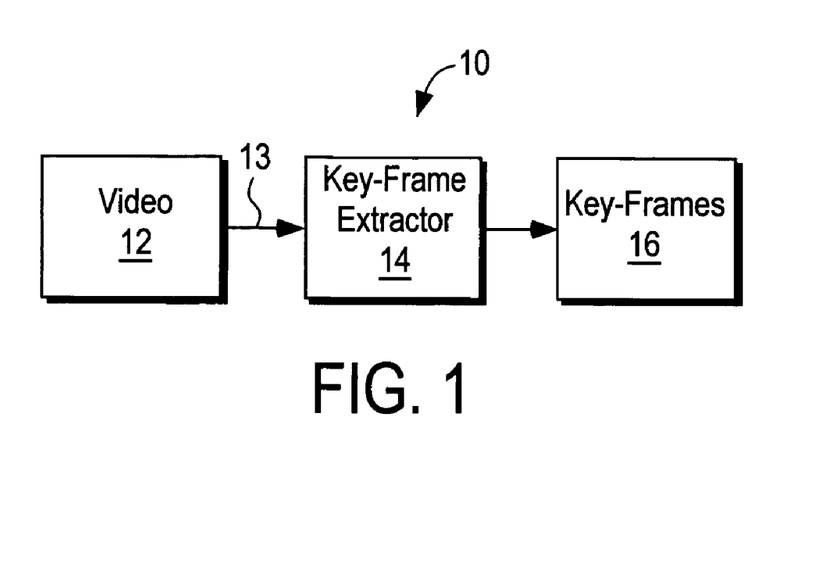
FIG. 1 shows a video system that incorporates the present teachings.

FIG. 1 shows a video system 10 that incorporates the present teachings. The video system 10 includes a key-frame extractor 14 that extracts a set of key-frames 16 from a series of video frames 13 in a video 12. The key-frame extractor 14 extracts the key-frames 16 from the video 12 using a method that is adapted to edited video. For example, a professionally edited video is likely to include a number of carefully created shots that are carefully edited in comparison to amateur video that tends to be unedited and haphazard. A professional video may have relatively few camera motions that are relatively slow camera motions, e.g. camera motions that track the movement of an object. A professional video may have more frequent shot cuts in comparison to an amateur video.

Figure 2:
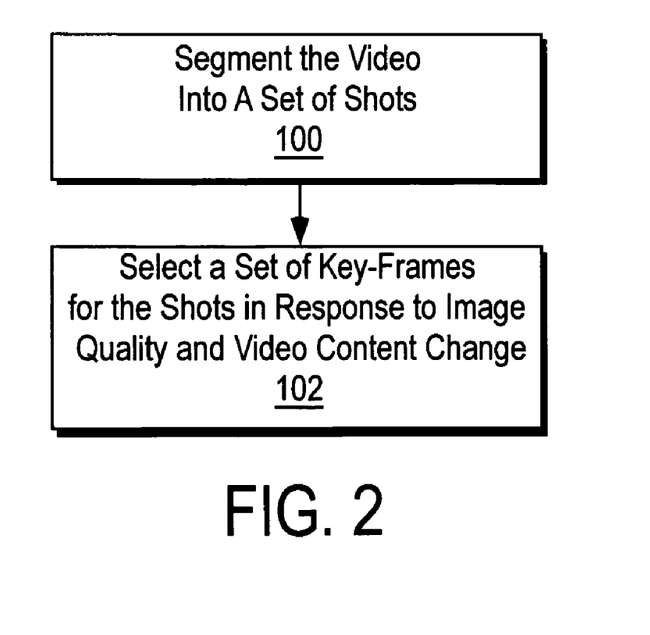
FIG. 2 shows a method for extracting a set of key-frames from a video.

FIG. 2 shows a method for extracting the key-frames 16 from the video 12. The method steps shown are performed by the key-frame extractor 14. At step 100, the video 12 is segmented into a set of shots. A shot may be defined as a continuously captured sequence of video frames. Step 100 includes detecting shots by detecting the boundaries between shots. The number of shots in the video 12 detected at step 100 is S. Each shot from step 100 includes a corresponding series of video frames from the video 12. At step 102, a set of key-frames are selected from each shot in response to an image quality and a video content change in the corresponding video frames.

Figure 3:
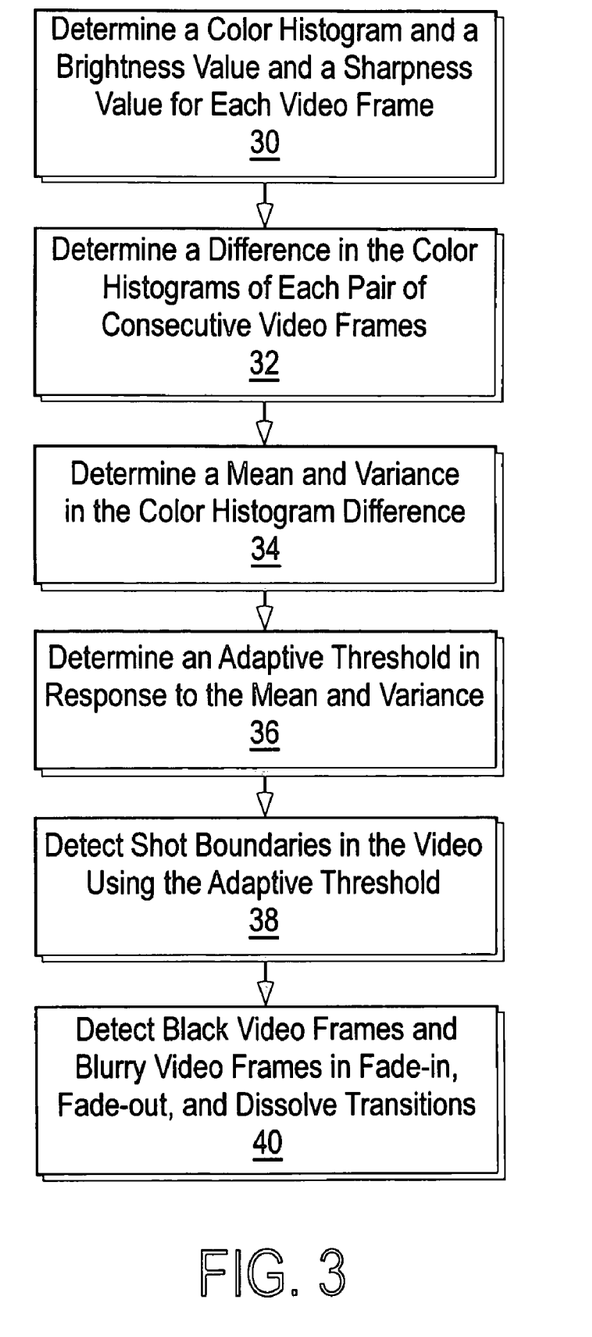
FIG. 3 shows a method for detecting shots in a video.

FIG. 3 shows a method for detecting shots in the video 12 at step 100. At step 30, a color histogram and a brightness and a sharpness are determined for each video frame 13 in the video 12.

A brightness of a video frame may be determined by computing an average luminance of the pixels in the video frame, e.g. according to the following equation.

$$\text{brightness} = \left( \sum_{i=1}^{N} \sum_{j=1}^{M} y(i, j) \right) \Big/ N \Big/ M$$

where y(i,j) is the luminance of the pixel at (i,j) in the video frame, and where N and M are the height and width of the video frame, respectively.

A sharpness of a video frame may be determined as follows. First, an edge detection filter is applied to the video frame, e.g. according to the following.

$$E_x(i, j) = ((y(i-1, j+1) - y(i-1, j-1)) +$$
$$(y(i, j+1) - y(i, j-1)) \times 2 + (y(i+1, j+1) - y(i+1, j-1)))/8$$
$$E_y(i, j) = ((y(i+1, j-1) - y(i-1, j-1)) + (y(i+1, j) - y(i-1, j)) \times 2 +$$
$$(y(i+1, j+1) - y(i-1, j+1)))/8$$
$$25 \text{ for } i = 2, \ldots, N-1;$$
$$j = 2, \ldots, M-1.$$

Next, the sharpness may be determined using the following equation.

$$\text{sharpness} = \left( \sum_{i=2}^{N-1} \sum_{j=2}^{M-1} (|E_x(i, j)| + |E_y(i, j)|) \right) \Big/ (N-2) \Big/ (M-2)$$

At step 32, a difference between the color histograms of each pair of consecutive video frames in the video 12 is determined. The differences between the pairs of color histograms provide a temporal curve of the color histogram difference.

At step 34, a mean and a variance in the color histogram difference are determined. At step 36, an adaptive threshold is determined in response to the mean and the variance from step 34. An adaptive threshold for step 36 may be threshold=mean*ALPHA+std*BETA where ALPHA=2 and BETA=3 and the mean and std are updated with every new frame. The mean and the variance are updated with each new set of color histogram difference data from step 32.

At step 38, a set of shot boundaries are detected in the video 12 using the adaptive threshold from step 36. Clean shots in the video 12 are sequences of video frames that do not include transitions, e.g. sequences of video frames in the video 12 that do not dissolve, sequences of video frames in the video 12 that do not fade-in, and sequences of video frames in the video 12 that do not fade-out. The adaptive threshold at step 36 also enables detection of sequences of video frames that indicate a dissolve boundary between shots in the video 12. The adaptive threshold at step 36 may create false alarms if there are lighting changes in the background of the video 12 but in such rare cases it has little impact on key-frame extraction.

At step 40, black video frames and blurry video frames in fade-in, fade-out, and dissolve transitions in the video 12 are detected. The fade-in and fade-out boundaries between the shots in the video 12 may be indicated by black video frames in the video 12 and by detecting video frames in the video 12 having uniform color. The black video frames and the video frames having uniform color may be determined in response to the brightness and the sharpness of the frames. The elimination of the video frames that correspond to the fade-in and fade-out boundaries between the shots in the video 12 avoids selecting key-frames from a sequence of the video frames 13 that correspond to a transitional period in the video 12. The sharpness of the video frames may be used to avoid selecting key-frames that correspond to dissolve boundaries in the video 12.

Figure 4:
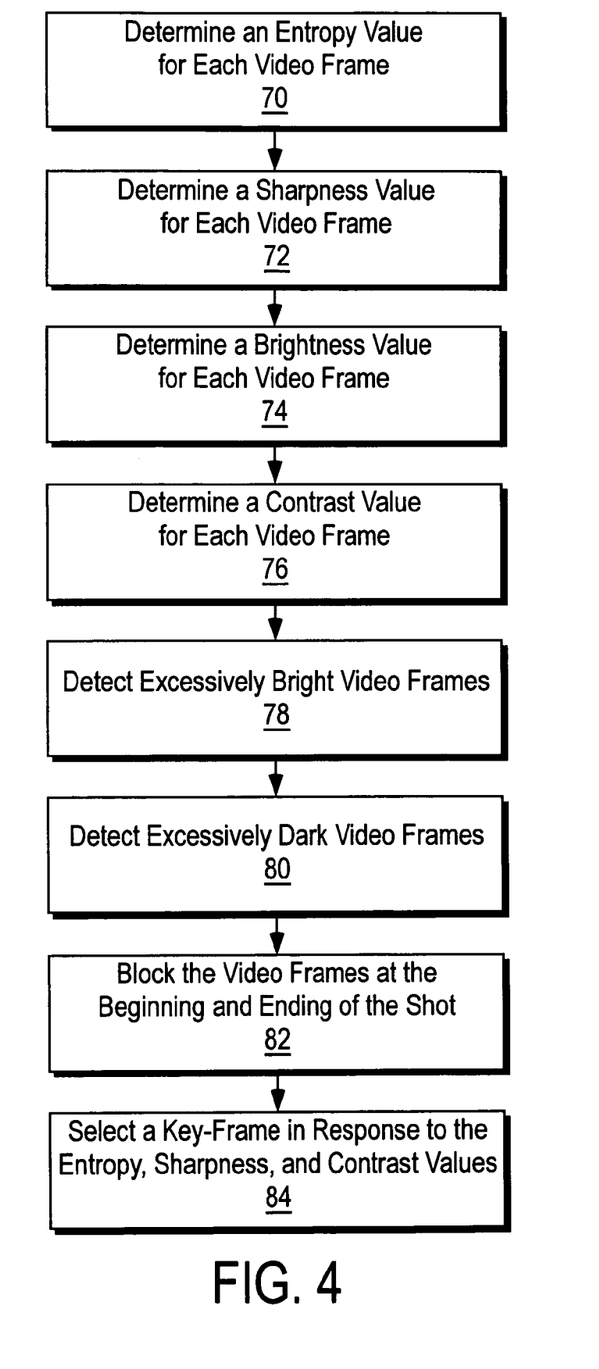
FIG. 4 shows a method for extracting a key-frame from a shot in a video.

FIG. 4 shows a method for selecting a key-frame from a shot in the video 12 at step 102. At step 70, an entropy is determined for each video frame in the shot.

An entropy of a video frame may be determined according to the following equation.

$$\text{entropy} = \left( \sum_{\substack{i=1 \\ hist(i)>0}}^{N} (hist(i) \times \log(hist(i))) \right) \times (-1) \Big/ \text{framesize}$$

where hist(i) is the histogram of the video frame, N is the number of bins of the histogram, framesize is the number of pixels in the video frame, i.e. framesize=frame_width*frame_height.

At step 72, a sharpness is determined for each video frame in the shot. At step 74, a brightness is determined for each video frame in the shot.

At step 76, a contrast is determined for each video frame in the shot. A contrast of a video frame may be determined by computing a variance of the luminance of the video frame, e.g. according to the following equation.

$$\text{contrast} = \left( \sum_{i=1}^{N} \sum_{j=1}^{M} |y(i,j) - \text{brightness}| \right) \Big/ N \Big/ M$$

At step 78, the video frames in the shot that are excessively bright are detected in response to the corresponding brightness and sharpness. The video frames in the shot that are excessively bright are avoided when selecting key-frames for the shot.

At step 80, the video frames in the shot that are excessively dark are detected in response to the corresponding brightness and sharpness. The video frames in the shot that are excessively dark are eliminated from consideration when selecting key-frames for the shot.

At step 82, the video frames in the shot that correspond to the beginning portion and ending portion of the shot are blocked from consideration when selecting key-frames for the shot. This avoids key-frames that correspond to a transition in the video 12 or a special effect in a shot change, e.g. a dissolve. This also avoids key-frames that are similar to each other in content.

At step 84, a key-frame is selected from among the remaining video frames in the shot in response to their entropy, sharpness, and contrast. The key-frame is selected to have the best entropy, sharpness, and contrast.

Figure 5:
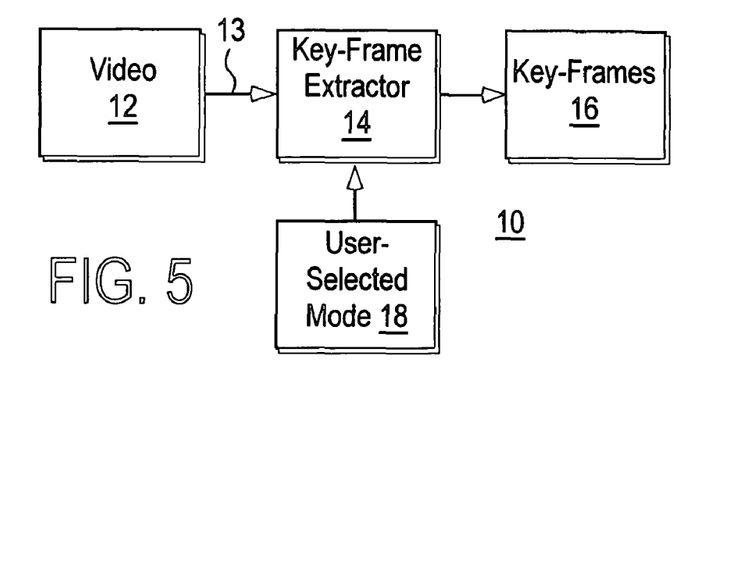
FIG. 5 shows a video system that includes a set of user-selectable modes for key-frame extraction.

FIG. 5 shows an embodiment of the video system 10 that includes a set of user-selectable modes for key-frame extraction. In this embodiment, the key-frame extractor 14 extracts the key-frames 16 from the video 12 in response to a user selected mode 18. The user selected mode 18 specifies one of a set of possible key-frame extraction modes (Modes 1-3). The user selectable Modes 1-3 enable key-frame extraction to be adapted to systems having different characteristics.

In Mode 1, the key-frame extractor 14 extracts one key-frame from each shot in the video 12. Mode 1 may be applicable constructing a story board for the video 12 using the extracted key-frames. The key-frame extracted for a shot in Mode 1 is the video frame in that shot having the best image quality. This contrasts with prior methods that extract the first frame or a random frame from a shot.

In Mode 2, the key-frame extractor 14 extracts a fixed number of key-frames for the entire length of the video 12. Mode 2 may be applicable to applications in which an area for displaying the key-frames 16 is limited, e.g. the display of a cell phone or PDA. A special case of Mode 2 is one key-frame that represents the video 12 as a thumbnail.

In Mode 3, the key-frame extractor 14 extracts key-frames at a fixed key-frame rate, i.e. one key-frame is extracted once every fixed period of time, e.g. one key-frame every two seconds. Mode 3 may be applicable to applications in which video content is transmitted via a communication channel having limited bandwidth. Mode 3 provides a user with refreshed key-frames at a fixed rate. The key-frame rate may be selected by a user.

Figure 6:
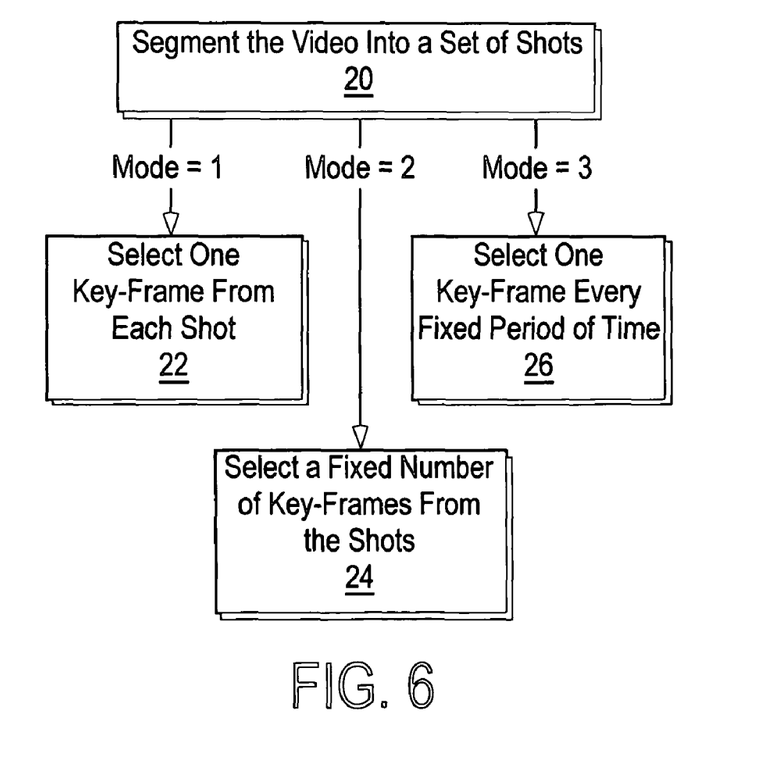
FIG. 6 shows a method for extracting a set of key-frames from a video using multiple key-frame extraction modes.

FIG. 6 shows a method for extracting the key-frames 16 from the video 12 using multiple key-frame extraction modes. The method steps shown are performed by the key-frame extractor 14 in response to the user selected mode 18 which specifies Mode 1, Mode 2, or Mode 3. At step 20, the video 12 is segmented into a set of S shots.

If the user selected mode 18 indicates Mode 1, then at step 22 one key-frame is selected from each shot found at step 20. A key-frame is selected from a shot at step 22 in accordance with the methods steps 70-84.

If the user selected mode 18 indicates Mode 2, then at step 24 a fixed number K of key-frames are selected from the S shots found at step 20. Step 24 includes allocating the K key-frames to the S shots. A key-frame is selected from a shot at step 24 in accordance with the methods steps 70-84.

If the user selected mode 18 indicates Mode 3, then at step 26 one key-frame is extracted from the shots yielded at step 20 once every fixed period of time (T). Step 26 includes allocating a key-frame to each period T of the video 12. A key-frame is extracted from the video 12 at step 26 in accordance with the methods steps 70-84 but operating on a period T within the video 12 rather than a shot.

Figure 7:
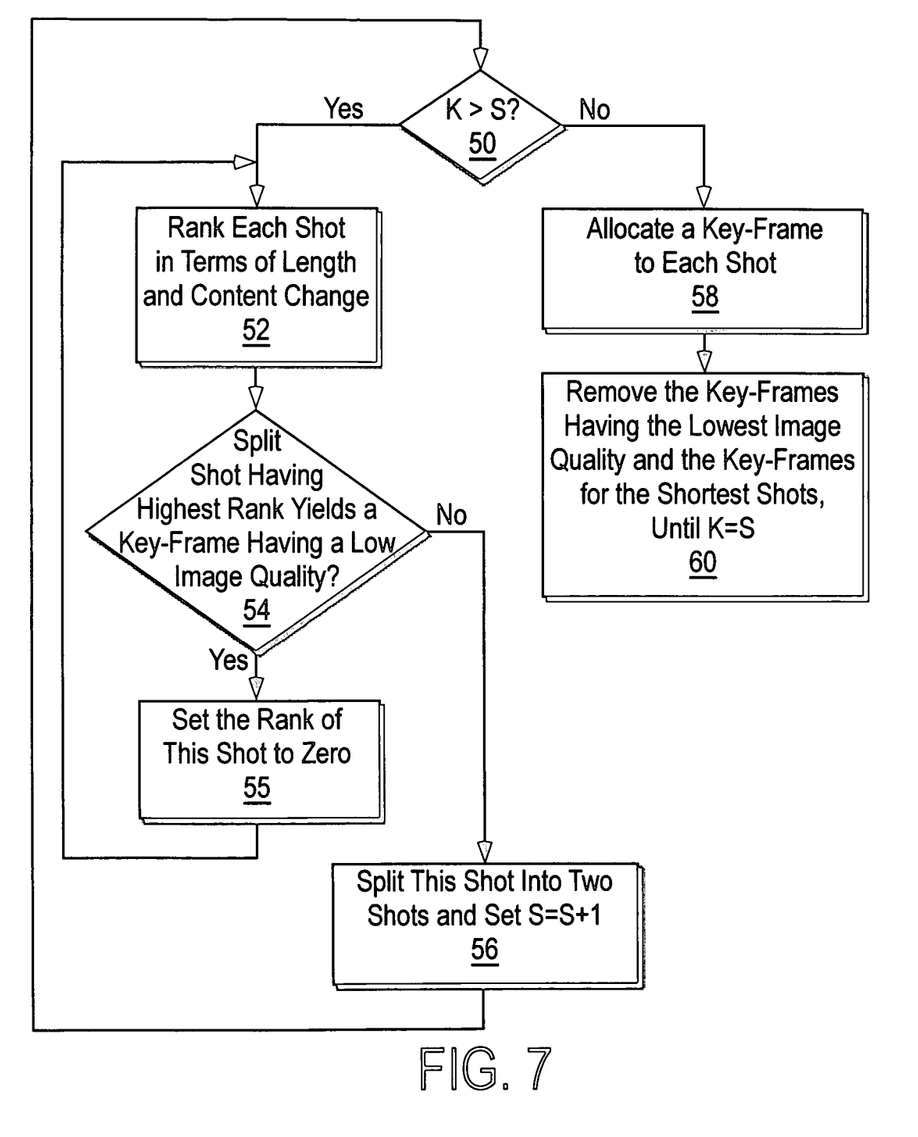
FIG. 7 shows a method for allocating a fixed number of key-frames to a set of shots in a video.

FIG. 7 shows a method for allocating the K key-frames to the S shots at step 24. At step 50, if K is greater than S, then at step 52 each of the S shots in the video 12 is ranked in terms its length and its content change score.

A rank of the $i^{th}$ shot may be determined as follows.

$$\text{rank}(i) = \text{length}(i) \times hc$$

where length(i) is the length of the shot in number of video frames in the shot, hc is the value indicating the largest histogram difference in the shot. The value of hc may be estimated by skipping the first and the last portions of the shot (e.g. skip the first 10 frames and the last 10 frames in the shot; or if the shot contains fewer than 30 frames, skip the first ⅓ and the last ⅓ of the shot), then, for the remainder of frames, computing the histogram difference between each pair of consecutive frames, and selecting the largest histogram difference value to be hc.

At step 54, the shot with the highest rank is selected. The shot selected at step 54 is examined to determine whether a low quality key-frame may be generated if it is split into two shots, e.g. one of the new shots may contain only low quality video frames. A quality score for ranking a quality of a video frame may be computed in response to the entropy, sharpness and contrast of the video frame, e.g. quality score=entropy/ 2+sharpness/4+contrast/4.

If a low quality key-frame can be generated, then at step 55 the rank of the shot selected at step 54 is set to zero. Otherwise, at step 56 the shot with the highest rank is split into two at the video frame in the shot having the largest histogram change, e.g. a video frame corresponding to an undetected dissolve or a video frame corresponding to a significant camera motion or object motion. The split segments from step 56 are treated as two new shots and the value of S is increased by 1. The rank of the two new shots are computed. The steps 52-56 continue until K equals S. Thereafter, one key-frame is selected from each shot in the video 12 in accordance with the methods steps 70 to 84.

At step 50, if K is less than S, then at step 58 one key-frame is allocated to each shot in the video 12 in accordance with the methods steps 70 to 84. At step 60, the key-frames allocated at step 58 that have the lowest image quality are removed and the key-frames allocated at step 58 that correspond to the shortest shots are removed until the number of key-frames K equals the number of shots S.

Figure 8:
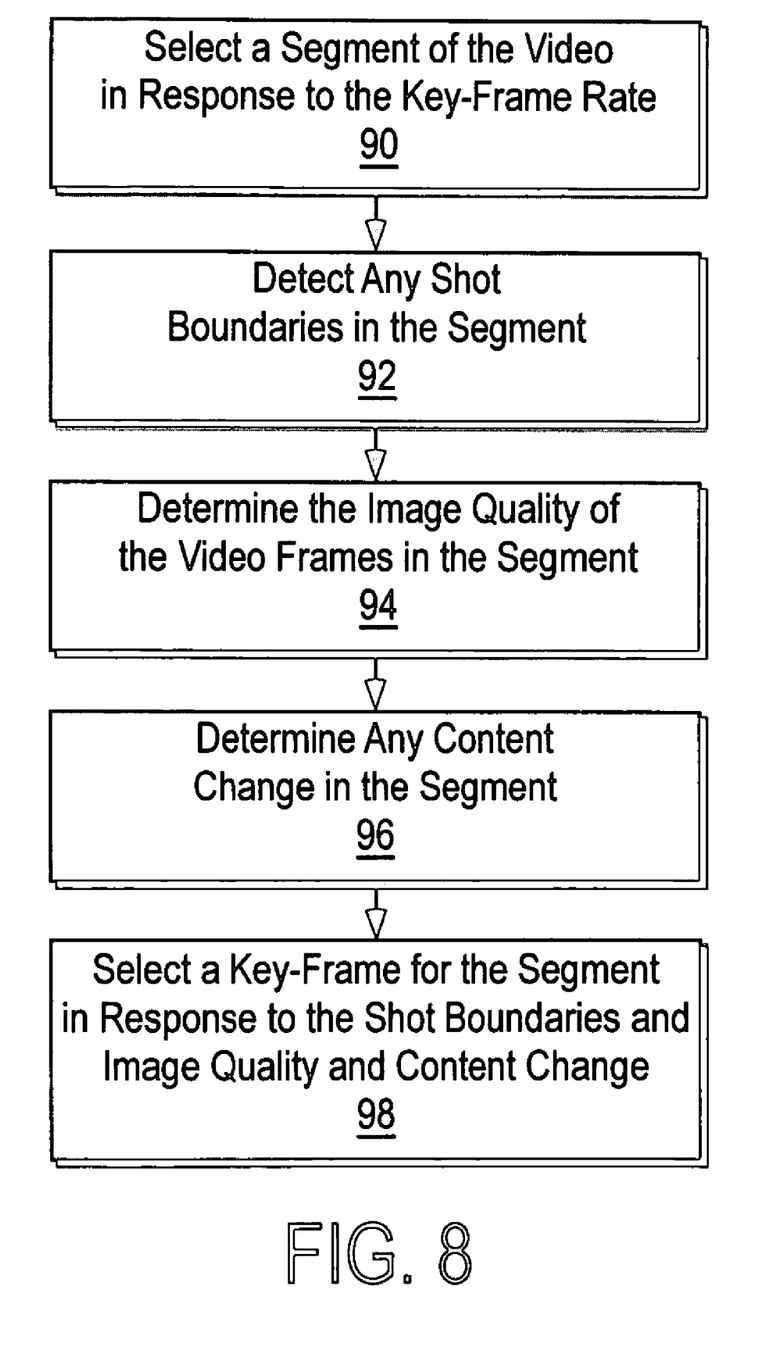
FIG. 8 shows a method for allocating a key-frame to each period of a video in a fixed rate mode.

FIG. 8 shows a method for allocating a key-frame to each period T of the video 12 at step 26. At step 90, a segment of the video 12 is selected in response to the key-frame rate 1/T. The initial segment at step 90 includes the video frames in the video 12 bounded by the first video frame in the video 12 (the video frame at time t0) and the video frame in the video 12 at time t0+T. The next segment at step 90 includes the video frames in the video 12 bounded by the video frame in the video 12 at time t0+T and the video frame in the video 12 at time t0+2T, and so on for subsequent segments.

At step 92, the shot boundaries, if any, in the segment of the video 12 selected at step 90 are detected. At step 94, the image quality in the video frames in the segment of the video 12 selected at step 90 are determined. At step 96, the content change, if any, in the segment of the video 12 selected at step 90 is determined. At step 98, a key-frame is selected from the segment of the video 12 selected at step 90 in response to the shot boundaries and the image quality and the content change. For example, if there is a shot boundary in the segment and at least one key-frame has been selected from the first shot in a previous segment, then one key-frame is allocated to the second shot. If there is no shot boundary in the segment, then one key-frame is selected after the greatest content change in the segment. The video frame with the best image quality is selected as the key-frame.

The video system 10 may be implemented in a variety of systems including computer systems, video systems, handheld devices, etc.

The present techniques may be used to manage collections of video clips. The key-frames extracted from video clips may be used for video printing and/or video browsing and video communication, e.g. through email, cell phone display, etc. The above methods for key-frame extraction yield key-frames that may indicate highlights in a video clip and depict content in a video clip that may be meaningful to a viewer. The present techniques provide a comprehensive representation of the content of video clips. The extracted key-frames may be used for thumbnail representations of video clips, for previewing video clips, as well as categorizing and retrieving video data. Extracted key-frames may be used for printing storybooks, postcards, etc.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for key-frame extraction, comprising:
segmenting a video of video frames into a set of shots each having a set of the video frames of the video, by:
determining a color histogram for each video frame;
determining a difference in the color histograms of each pair of a plurality of pairs of consecutive video frames of the video of video frames;
determining a mean and variance in the difference in the color histograms of each pair;
determining an adaptive threshold based on the mean and the variance;
detecting shot boundaries within the video using the adaptive threshold; and
selecting a set of key-frames from the shots in response to an image quality of the corresponding video frames.

2. The method of claim 1, wherein selecting includes selecting the key-frames in response to a video content change in the corresponding video frames.

3. The method of claim 2, wherein selecting includes determining the video content change by determining a histogram difference in the corresponding video frames.

4. The method of claim 1, wherein selecting includes selecting the key-frames in response to an entropy for each corresponding video frame.

5. The method of claim 1, wherein selecting includes selecting the key-frames in response to a sharpness for each corresponding video frame.

6. The method of claim 1, wherein selecting includes selecting the key-frames in response to a contrast for each corresponding video frame.

7. The method of claim 1, wherein selecting includes selecting the key-frames in response to a user selected mode.

8. The method of claim 7, wherein selecting a set of key-frames includes selecting a fixed number of key-frames for the video as specified by the user selected mode.

9. The method of claim 7, wherein selecting includes selecting a fixed rate of key-frames for the video as specified by the user selected mode.

10. The method of claim 7, wherein selecting includes selecting one key-frame for each shot in the video as specified by the user selected mode.

11. A video system including a key-frame extractor that segments a video of video frames into a set of shots each having a set of the video of the video frames and that selects a set of key-frames from the shots in response to an image quality of the corresponding video frames,
    wherein the key-frame extractor segments the video by:
        determining a color histogram for each video frame;
        determining a difference in the color histograms of each pair of a plurality of pairs of consecutive video frames of the video of video frames;
        determining a mean and variance in the difference in the color histograms of each pair;
        determining an adaptive threshold based on the mean and the variance; and,
        detecting shot boundaries within the video using the adaptive threshold.

12. The video system of claim 11, wherein the key-frame extractor selects the key-frames in response to a video content change in the corresponding video frames.

13. The video system of claim 12, wherein the key-frame extractor selects the key-frames in response to a user selected mode.

14. The video system of claim 13, wherein the user selected mode specifies a fixed number of key-frames for the video.

15. The video system of claim 14, wherein the key-frame extractor selects the key-frames by ranking the shots according length and content.

16. The video system of claim 15, wherein the key-frame extractor selects the key-frames by splitting one of the shots into two shots at a video frame having a greatest content change.

17. The video system of claim 14, wherein the key-frame extractor selects the key-frames by removing a key-frame having a low image quality.

18. The video system of claim 14, wherein the key-frame extractor selects the key-frames by removing a key-frame that corresponds to a short shot.

19. The video system of claim 13, wherein the user selected mode specifies a fixed rate of key-frames for the video.

20. The video system of claim 19, wherein the key-frame extractor selects the key-frames by dividing the video into a set of segments having a fixed length in response to the fixed rate by allocating one key-frame to each of a set of segments in the video in response to a set of shot boundaries and content changes.

* * * * *